(12) United States Patent
Thiergart et al.

(10) Patent No.: US 9,984,702 B2
(45) Date of Patent: May 29, 2018

(54) EXTRACTION OF REVERBERANT SOUND USING MICROPHONE ARRAYS

(71) Applicant: Fraunhofer-Gesellschaft zur Foerderung der angewandten Forschung e.V., Munich (DE)

(72) Inventors: Oliver Thiergart, Erlangen (DE); Emanuel Habets, Spardorf (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days. days.

(21) Appl. No.: 15/178,530

(22) Filed: Jun. 9, 2016

(65) Prior Publication Data

US 2016/0293179 A1 Oct. 6, 2016

Related U.S. Application Data

(63) Continuation of application No. PCT/EP2014/076252, filed on Dec. 2, 2014.

(30) Foreign Application Priority Data

Dec. 11, 2013 (EP) .................................... 13196672
Feb. 20, 2014 (EP) .................................... 14156014

(51) Int. Cl.
*G10L 21/0264* (2013.01)
*G10L 21/02* (2013.01)
(Continued)

(52) U.S. Cl.
CPC .......... *G10L 21/0264* (2013.01); *G10L 19/26* (2013.01); *G10L 21/02* (2013.01);
(Continued)

(58) Field of Classification Search
None
See application file for complete search history.

(56) References Cited

U.S. PATENT DOCUMENTS

| | | | | |
|---|---|---|---|---|
| 2004/0175006 A1* | 9/2004 | Kim | ...................... | H04R 1/406 381/92 |
| 2005/0201204 A1* | 9/2005 | Dedieu | ................. | G01S 3/8006 367/118 |

(Continued)

FOREIGN PATENT DOCUMENTS

| | | |
|---|---|---|
| JP | 2013061421 A | 4/2013 |
| JP | 2013171076 A | 9/2013 |

(Continued)

OTHER PUBLICATIONS

Taseska et al, "MMSE-based blind source extraction in diffuse noise fields using a complex coherence-based a priori SAP estimator." Sep. 4, 2012-Sep. 6, 2012. pp. 1-4.*

(Continued)

*Primary Examiner* — Curtis Kuntz
*Assistant Examiner* — Qin Zhu
(74) *Attorney, Agent, or Firm* — Michael A. Glenn; Perkins Coie LLP

(57) ABSTRACT

A method includes estimating a spatial coherence between a first diffuse sound portion in a first microphone signal and a second diffuse sound portion in a second microphone signal. The first microphone signal is captured by a first microphone and the second microphone signal is captured by a second microphone which is spaced apart from the first microphone in a known manner. The method further includes defining a linear constraint for filter coefficients of a diffuse sound filter, the linear constraint being based on the spatial coherence. The method also includes calculating at least one of signal statistics and noise statistics over the first microphone signal and the second microphone signal. The method also (Continued)

includes determining the filter coefficients of the diffuse sound filter by solving an optimization problem concerning at least one of the signal statistics and noise statistics while considering the linear constraint for the filter coefficients.

16 Claims, 7 Drawing Sheets

(51) Int. Cl.

| | | |
|---|---|---|
| *G10L 19/26* | (2013.01) | |
| *G10L 21/0208* | (2013.01) | |
| *G10L 21/0216* | (2013.01) | |
| *G11B 20/10* | (2006.01) | |
| *H04R 5/027* | (2006.01) | |
| *H04R 3/00* | (2006.01) | |

(52) U.S. Cl.
CPC .......... *G10L 21/0208* (2013.01); *H04R 3/005* (2013.01); *H04R 5/027* (2013.01); *G10L 2021/02082* (2013.01); *G10L 2021/02166* (2013.01); *G11B 2020/10601* (2013.01); *H04S 2400/15* (2013.01); *H04S 2420/01* (2013.01)

(56) References Cited

U.S. PATENT DOCUMENTS

| | | | |
|---|---|---|---|
| 2005/0232441 A1* | 10/2005 | Beaucoup | H04M 9/082 381/92 |
| 2008/0069366 A1 | 3/2008 | Soulodre et al. | |
| 2008/0089522 A1* | 4/2008 | Baba | H04S 7/305 381/17 |
| 2009/0252355 A1 | 10/2009 | Mao et al. | |
| 2009/0299742 A1 | 12/2009 | Toman et al. | |
| 2010/0169103 A1 | 7/2010 | Pulkki et al. | |
| 2012/0063608 A1 | 3/2012 | Soulodre et al. | |
| 2012/0099732 A1* | 4/2012 | Visser | G10L 21/0272 381/17 |
| 2012/0128160 A1 | 5/2012 | Kim et al. | |
| 2013/0022206 A1* | 1/2013 | Thiergart | G10L 19/008 381/17 |
| 2013/0066628 A1 | 3/2013 | Takahashi et al. | |
| 2013/0216047 A1* | 8/2013 | Kuech | G10L 19/008 381/26 |
| 2013/0230184 A1* | 9/2013 | Kuech | H04R 3/002 381/66 |
| 2013/0272548 A1* | 10/2013 | Visser | G06K 9/00624 381/122 |
| 2015/0016622 A1 | 1/2015 | Kawaguchi et al. | |

FOREIGN PATENT DOCUMENTS

| | | |
|---|---|---|
| JP | 2013179388 A | 9/2013 |
| RU | 2343562 C1 | 1/2009 |
| WO | 2008034221 A1 | 3/2008 |

OTHER PUBLICATIONS

Souden et al, "A study of the LCMV and MVDR noise reduction filters." Sep. 2010. pp. 1-11.*
Elko, "Spatial coherence functions for differential microphones in isotropic noise fields." 2001. pp. 1-25.*
Elko, G.W., "Spatial Coherence Functions for Differential Microphones in Isotropic Noise Fields", Microphone Arrays: Signal Processing Techniques and Applications; edited by M. Brandstein and D. Ward; Chapter 4; Springer, 2001, pp. 61-85.
Kowalczyk, K. et al., "Sound Acquisition in Noisy and Reverberant Environments Using Virtual Microphones", 2013 IEEE Workshop on Applications of Signal Processing to Audio and Acoustics (WASPAA, Oct. 2013, 4 pages.
Pulkki, V, "Spatial Sound Reproduction with Directional Audio Coding", Journal of the AES. vol. 55, No. 6. New York, NY, USA., Jun. 2007, pp. 503-516.
Thiergart, O. et al., "An Informed LCMV Filter Based on Multiple Instantaneous Direction-of-Arrival Estimates", 2013 IEEE International Conference on Acoustics Speech and Signal Processing (ICASSP), Vancouver, BC, Canada., May 2013, pp. 659-663.
Thiergart, O. et al., "Geometry-based Spatial Sound Acquisition Using Distributed Microphone Arrays", IEEE Transactions on Audio, Speech, and Language Processing; vol. 21, No. 12, Dec. 2013, pp. 2583-2594.
Thiergart, O. et al., "On the Spatial Coherence in Mixed Sound Fields and its Application to Signal-to-Diffuse Ratio Estimation", The Journal of the Acoustical Society of America; vol. 132; No. 4, Oct. 2012, pp. 2337-2346.
Van Trees, H. L., "Detection, Estimation, and Modulation Theory: Part IV: Array Processing", John Wiley & Sons, vol. 1, Apr. 2002, 1470 pages.

* cited by examiner

EXTRACTION OF REVERBERANT SOUND USING MICROPHONE ARRAYS

CROSS-REFERENCE TO RELATED APPLICATIONS

This application is a continuation of copending International Application No. PCT/EP2014/076252, filed Dec. 2, 2014, which is incorporated herein in its entirety by this reference thereto, and which claims priority from European Applications Nos. EP 13 196 672.3, filed Dec. 11, 2013, and from EP 14 156 014.4, filed Feb. 20, 2014, which are each incorporated herein in its entirety by this reference thereto.

BACKGROUND OF THE INVENTION

The following invention is in the field of acoustic analysis, spatial sound recording, microphone array signal processing, and spatial filtering. Some embodiments of the present invention relate to a method that can be used to determine the filter coefficients of a diffuse sound filter, i.e., a filter for extracting diffuse sound (reverberant sound) from the recordings with a microphone array. Some embodiments relate to a corresponding computer program. Some embodiments relate to an apparatus that can be used to determine the filter coefficients of a diffuse sound filter.

Sound acquisition with microphone arrays in reverberant environments typically aims at capturing the direct sound of the sound sources while attenuating noise and reverberation. For many applications it would be beneficial if we were able to extract also the reverberant sound while suppressing the direct sound and noise. For instance in spatial sound reproduction [Pulkki2007, Thiergart2013, Kowalczyk2013], the reverberation present at the recording side needs to be reproduced at the reproduction side to recreate the desired spatial impression. Moreover, given an estimate of the reverberant sound, we can compute parameters such as the signal-to-reverberation ratio or reverberant sound power, which represent crucial information for various other applications.

While the estimation of direct sound components (e.g., using source separation, dereverberation, or noise reduction) is well addressed in literature, only few approaches exist for extracting reverberant sound. Usually, reverberation is modeled as a (time-varying) diffuse sound field. To extract the diffuse sound, single-channel filters have been used recently (e.g., in [Pulkki2007, Thiergart2013]), which yield poor performance when multiple sources are active or for transient-like signals. A better performance can be achieved with multi-channel filters (e.g., [Kowalczyk2013, Thiergart2013b]). Unfortunately, currently existing multi-channel filters are not optimal and do not yield a suitable directivity pattern for capturing diffuse sound.

It would therefore be desirable to provide a diffuse sound filter having improved performance in terms of diffuse sound extraction and/or direct sound suppression. It may also be desirable that the diffuse sound filter has a directional response that is highly omnidirectional, with the exception of directions of arrival of direct sound components. A highly omnidirectional directional response is desired since the diffuse sound arrives from all directions at the microphone array.

SUMMARY

According to an embodiment, a method may have the steps of: defining a linear constraint for filter coefficients of a diffuse sound filter, the linear constraint being based on a spatial coherence between a first diffuse sound portion in a first microphone signal and a second diffuse sound portion in a second microphone signal, the first microphone signal being captured by a first microphone and the second microphone signal being captured by a second microphone spaced apart from the first microphone in a known manner; calculating at least one of a direction of arrival of at least one direct sound, signal statistics over the first and second microphone signals, and noise statistics over the first and second microphone signals; and determining the filter coefficients of the diffuse sound filter by solving an optimization problem concerning at least one of the direction of arrival of the at least one direct sound, the signal statistics, and the noise statistics while considering the linear constraint for the filter coefficients.

According to another embodiment, a non-transitory digital storage medium may have stored thereon a computer program for performing a method comprising: defining a linear constraint for filter coefficients of a diffuse sound filter, the linear constraint being based on a spatial coherence between a first diffuse sound portion in a first microphone signal and a second diffuse sound portion in a second microphone signal, the first microphone signal being captured by a first microphone and the second microphone signal being captured by a second microphone spaced apart from the first microphone in a known manner; calculating at least one of a direction of arrival of at least one direct sound, signal statistics over the first and second microphone signals, and noise statistics over the first and second microphone signals; and determining the filter coefficients of the diffuse sound filter by solving an optimization problem concerning at least one of the direction of arrival of the at least one direct sound, the signal statistics, and the noise statistics while considering the linear constraint for the filter coefficients, when said computer program is run by a computer.

According to another embodiment, an apparatus may have: a linear constraint calculator configured to define a linear constraint for filter coefficients of a diffuse sound filter, the linear constraint being based on a spatial coherence between a first diffuse sound portion in a first microphone signal and a second diffuse sound portion in a second microphone signal, the first microphone signal being captured by a first microphone and the second microphone signal being captured by a second microphone spaced apart from the first microphone in a known manner; a calculator configured to calculate at least one of a direction of arrival of at least one direct sound, signal statistics over the first and second microphone signals, and noise statistics over the first and second microphone signals; and a filter coefficients calculator configured to determine the filter coefficients of the diffuse sound filter by solving an optimization problem concerning at least one of the direction of arrival of the at least one direct sound, the signal statistics, and the noise statistics while considering the linear constraint for the filter coefficients.

A method is provided which comprises defining a linear constraint for filter coefficients of a diffuse sound filter. The linear constraint is based on a spatial coherence between a first diffuse sound portion in a first microphone signal and a second diffuse sound portion in a second microphone signal. The first microphone signal is captured by a first microphone and the second microphone signal is captured by a second microphone spaced apart from the first microphone in a known manner. The method also comprises calculating at least one of a direction of arrival of at least one direct sound, signal statistics over the first and second microphone signals, and noise statistics over the first and second microphone signals. The method further comprises determining the filter coefficients of the diffuse sound filter by solving an optimization problem concerning at least one of the direction of arrival of the at least one direct sound, the signal statistics, and the noise statistics while considering the linear constraint for the filter coefficients.

Embodiments provide a computer program for implementing the above-described method when being executed on a computer or signal processor is provided.

Further embodiments provide an apparatus comprising a linear constraint calculator configured to define a linear constraint for filter coefficients of a diffuse sound filter. The linear constraint is based on a spatial coherence between a first diffuse sound portion in a first microphone signal and a second diffuse sound portion in a second microphone signal. The first microphone signal is or has been captured by a first microphone and the second microphone signal is or has been captured by a second microphone spaced apart from the first microphone in a known manner. The apparatus also comprises a statistics calculator configured to calculate at least one of a direction of arrival of at least one direct sound, signal statistics over the first and second microphone signals, and noise statistics over the first and second microphone signals and the second microphone signal. The apparatus further comprises a filter coefficients calculator configured to determine the filter coefficients of the diffuse sound filter by solving an optimization problem concerning at least one of the direction of arrival of the at least one direct sound, the signal statistics, and the noise statistics while considering the linear constraint for the filter coefficients.

Embodiments are based on the insight that a diffuse sound filter may be determined while taking into account at least one linear constraint that is related to the diffuse sound portions of the microphone signals.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
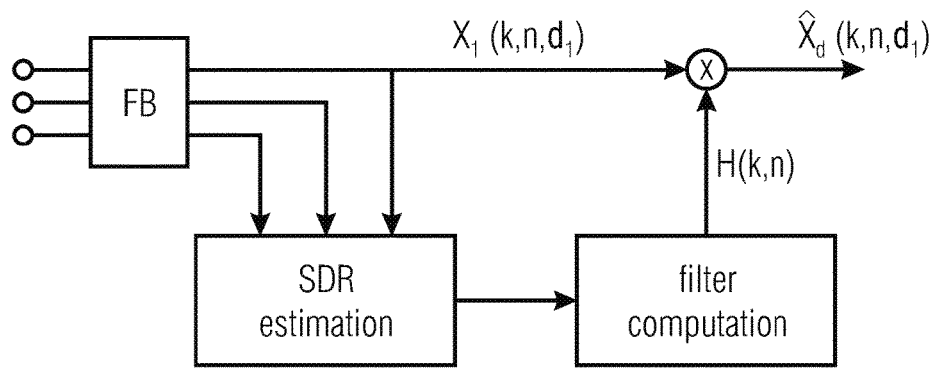
FIG. 1 shows a schematic block diagram of an approach for extracting diffuse sound with a single-channel filter.

The terms "direct sound" and "diffuse sound" are defined as follows.

Direct sound: sounds that arrive from mainly a specific prominent direction at the microphones. The direct sound can represent for instance the sound travelling directly from the sound source to the microphone or a distinct room reflection. Direct sounds can be for instance plane waves or spherical waves with a specific direction of arrival. When the direction of arrival of a direct sound is known, one can compute the relative transfer function of the direct sound between the microphones given that the microphone geometry is known.

Diffuse sound: sound that arrives at the microphones from all directions. The diffuse sound can represent for instance the later reverberation present in a room. Typically, no prominent direction-of-arrival can be associated with a diffuse sound (isotropic sound field), i.e., the sound is arriving with equal mean power from all directions. Moreover, the relative transfer functions of the diffuse sound between the microphones should be assumed random and unobservable. However, the mean relative transfer functions of the diffuse sound between the microphones are usually known for specific microphone setups and diffuse field assumptions or can be measured.

The following subsections summarize existing approaches to extract diffuse sound (or reverberant sound) from a microphone recording. In the following, M denotes the number of microphones used. We assume that all microphone signals have been transformed into the time-frequency domain where k is the frequency index and n is the time index (note that the filters can typically be applied in the time-domain as well). The microphones capture L plane waves (referred to as direct sound) propagating in a diffuse field. The DOA of the l-th plane wave is represented by the unit-norm vector $n_l(k,n)$. In the time-frequency domain, the signal of the m-th (omnidirectional) microphone can be written as $$X_m(k, n) = \sum_{l=1}^{L} X_l(k, n, d_m) + X_d(k, n, d_m) + X_n(k, n, d_m)$$

Here, $X_l(k,n)$ is the sound pressure of the l-th plane wave, $X_d(k,n,d_m)$ is the diffuse sound, $X_n(k,n,d_m)$ is a stationary noise (e.g., self-noise or background noise), and $d_m$ is a vector describing the microphone position (of the m-th microphone) in a given coordinate system.

The aim of this invention is to estimate $X_d(k,n,d_m)$ at position $d_m$.

Single-channel filters extract the diffuse sound from a single microphone signal (=1). Such filters are used for example in Directional Audio Coding [Pulkki2007] or in the Virtual Microphone [Thiergart2013].

An estimate of the diffuse sound is found by multiplying one of the microphone signals, for example the microphone signal of the first microphone $X_1(k,n)$, with a filter $H(k,n)$, e.g., $$\hat{X}_d(k,n,d_m) = X_1(k,n)H(k,n)$$

Usually, the filter $H(k,n)$ is a Wiener filter, which is given by $$H(k, n) = \frac{\phi_d(k, n)}{\phi_d(k, n) + \phi_u(k, n)}$$

where $\phi_d$ is the power of the diffuse sound and $\phi_u$ is the power of the plane waves and the stationary noise. In some applications, the square-root Wiener filter (i.e., the square-root of H) is used instead of the Wiener filter. Note that in order to compute H(k,n), one has to estimate the power $\phi_d$ and $\phi_u$. For this purpose, we can consider for instance the signal-to-diffuse ratio (SDR), which can be estimated as explained in [Thiergart2012]. Alternatively, H(k,n) can be found by estimating the so-called diffuseness, as described in [Pulkki2007, Thiergart2013]. Estimating the SDR or diffuseness typically demands more than one microphone. Nevertheless, the diffuse sound is finally obtained by filtering a single microphone signal.

An example system for extracting the diffuse sound with a single-channel filter is illustrated in FIG. 1. First, the SDR (or alternatively the diffuseness) is estimated from the multiple microphone signals. Secondly, the filter H(k,n) is computed from this information. Finally, the filter H(k,n) is multiplied with a single microphone signal to obtain the diffuse sound estimate.

Multi-channel filters consider M>1 microphones. Such filters have been used for instance in [Thiergart2013b, Kowalczyk2013]. For the following derivations, let us represent the M microphone signals by a vector $x(k,n)=[X_1(k,n), X_2(k,n), \ldots, X_M(k,n)]^T$. The diffuse sound at the m-th microphone is estimated via a linear combination of the M microphone signals, i.e., $$\hat{X}_d(k,n,d_m) = w_m^H(k,n) x(k,n)$$

where $w_m$ is a complex weight-vector of length M. The weights of $w_m$ need to be computed such that an accurate estimate of the diffuse sound is obtained.

The straight-forward way to find an appropriate filter is to compute the weights $w_m$ such that the L plane waves are suppressed while the stationary noise $X_n(k,n,d_m)$, which is contained in the microphone signals, is minimized. Expressed mathematically, the filter weights are given by $$w_m(k,n) = \underset{w}{\operatorname{argmin}} \, w^H \Phi_n(k) w$$

subject to the linear constraints $$w^H a_l(k,n) = 0 \, \forall l$$

Here, $\Phi_n$ is the PSD matrix (power spectral density matrix) of the stationary noise, i.e., $\Phi_n = E\{x_n x_n^H\}$, which can be estimated with well-known approaches for instance when no diffuse sound or direct sound is present. Moreover, $a_l$ is the so-called propagation vector. Its elements are the relative transfer function of the l-th plane wave from the m-th microphone to the other microphones. Hence, $a_l$ is a column vector with length M (remember: only the diffuse sound at the m-th microphone is estimated by the $w_m$-weighted linear combination of the M microphone signals; the diffuse sound at the other microphones is substantially redundant, as these signals are related via relative transfer functions from the m-th microphone to the other microphones and could be calculated in this manner, if needed). The elements of $a_l$ depend on the DOA of the l-th plane wave. This means $a_l$ is a function of the DOA of the l-th plane wave, i.e., $a_l = f(n_l)$. Since $a_l$ depends on the direct sound (i.e., plane waves), it is referred to as direct sound constraint in the following. With this spatial filter we essentially create a beamformer, which has a pick-up pattern with nulls towards the directions of the L plane waves. As a result, all plane waves are suppressed. Unfortunately, solving this minimization problem above leads to zero weights $w_m$ since we only have null constraints, i.e., the diffuse sound cannot be extracted.

To overcome this problem and to avoid zero filter weights, [Thiergart2013b, Kowalczyk2013] proposes to use the same filter but with an additional constraint, given by $$w^H a_0(k,n) = 1$$

where $a_0$ is a propagation vector that corresponds to a specific DOA $n_0$, from which no plane wave arrives. With this constraint one avoids zero filter-weights, but still does not capture the undesired direct sound. As a result, with this filter only diffuse sound and some noise is captured but all plane waves are attenuated. In [Thiergart2013b], the DOA $n_0$, to which the vector $a_0$ corresponds, is found by choosing the direction which has the largest angular distance to all DOAs $n_l(k,n)$ of the plane waves. For instance if a single plane wave is arriving from 0 degree, then $n_l(k,n)$ would correspond to 180 degree. Unfortunately, the DOA $n_0$ does not guarantee that we obtain a diffuse sound estimate with as little noise as possible. Moreover, the resulting pick-up pattern is not very optimal for capturing diffuse sound, since it becomes highly directive at higher frequencies. This is a drawback when aiming at capturing diffuse sound from all directions.

Figure 6:
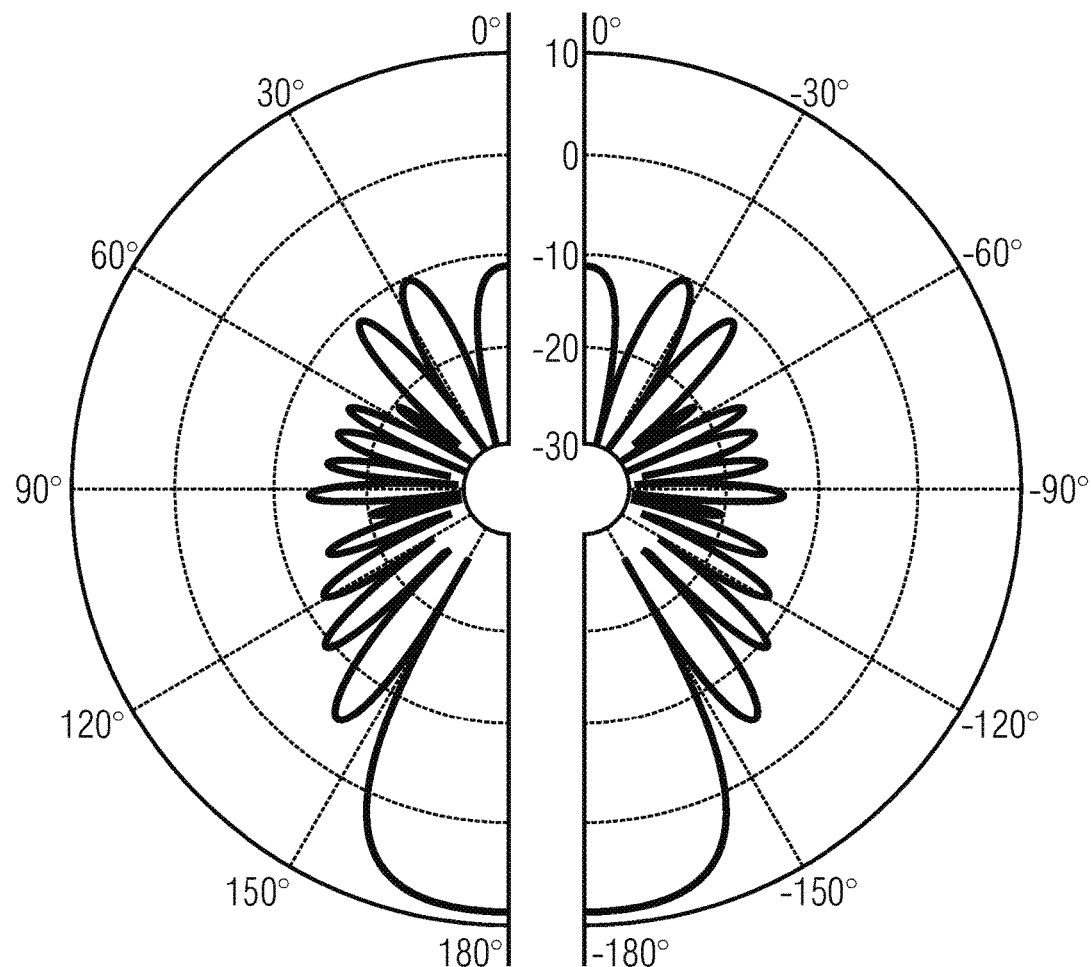
FIG. 6 shows an example of a pick-up pattern resulting from the approach for extracting diffuse sound with a filter according to FIG. 2.
Figure 7:
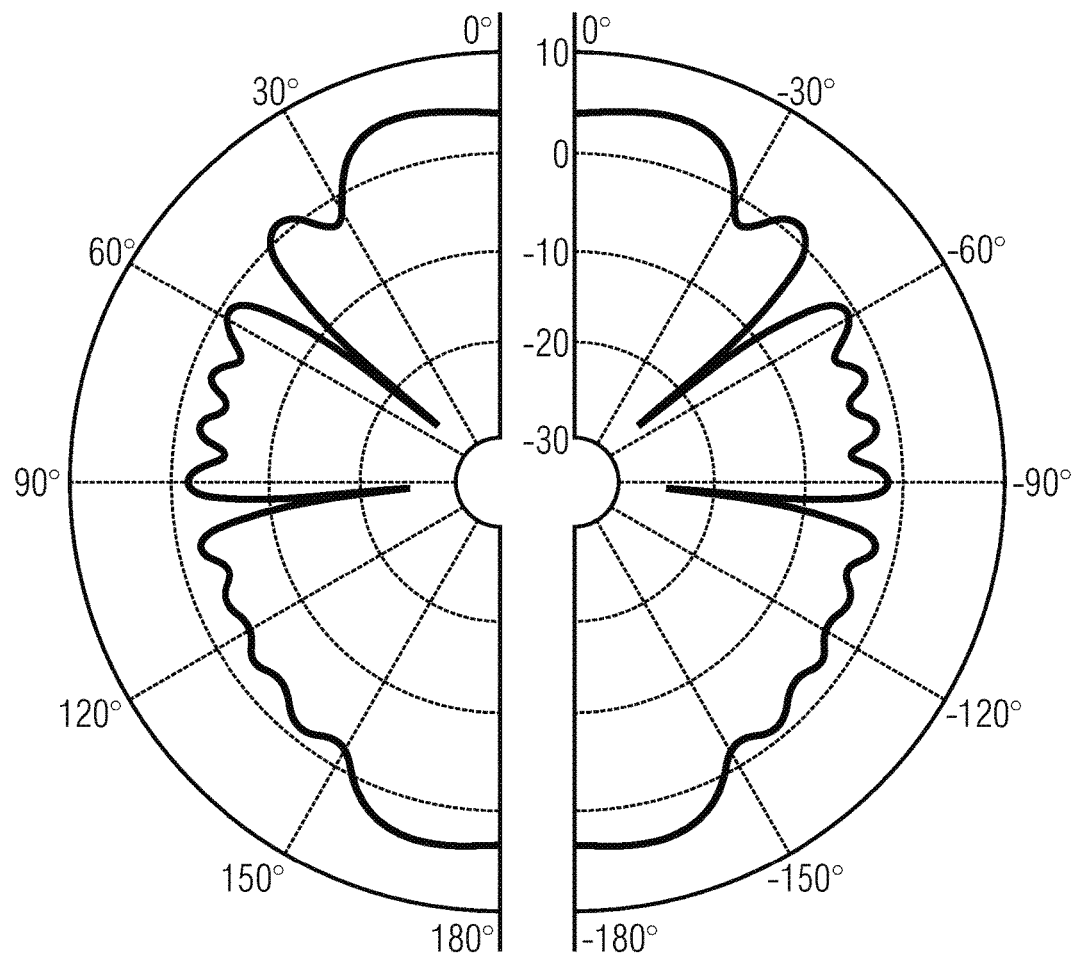
FIG. 7 shows an example of a pick-up pattern resulting from the approach for extracting diffuse sound with a filter according to FIG. 4.

An example of a resulting pick-up pattern is depicted in FIG. 6. Here, two direct sounds arrive from an azimuth direction 51° and 97°. The figure shows the resulting pick-up pattern at a frequency of 2.8 kHz when using an uniform linear array with 16 microphones with 5 cm microphone spacing. The pick-up pattern possess nulls exactly for 51° and 97° and a high gain for 180°, which corresponds to the direction $n_0$. Moreover, the pick-up pattern has multiple other spatial nulls or low gains for almost all other directions. This pick-up pattern is not suitable for capturing diffuse sound that arrives from all directions. Note again that the direct sound constraints $a_l$ are directly related to the DOAs of the direct sounds. A desired pick-up pattern, which cannot be achieved with the spatial filter in this subsection, is depicted in FIG. 7. This pick-up pattern has two spatial nulls for the DOAs of the direct sounds, but otherwise it is almost omnidirectional. This pick-up pattern is achieved by using the proposed filter which is described below in connection with FIG. 7.

A closed-form solution to compute the filter weights $w_m$ given the constraints above can be found in [VanTrees2002]. In order to compute the spatial filter, one needs to know the DOA of the L plane waves, namely to compute the direct sound constraints $a_l$ and $a_0$. This DOA information can be determined with well-known narrowband DOA estimators, such as Root MUSIC or ESPRIT. Note further that the elements of $a_0$ are typically complex and $a_0$ typically needs to be recomputed for each k and n, since the DOAs of the plane waves should be assumed highly time-varying. The highly fluctuating $a_0$ can lead to audible artifacts.

Figure 2:
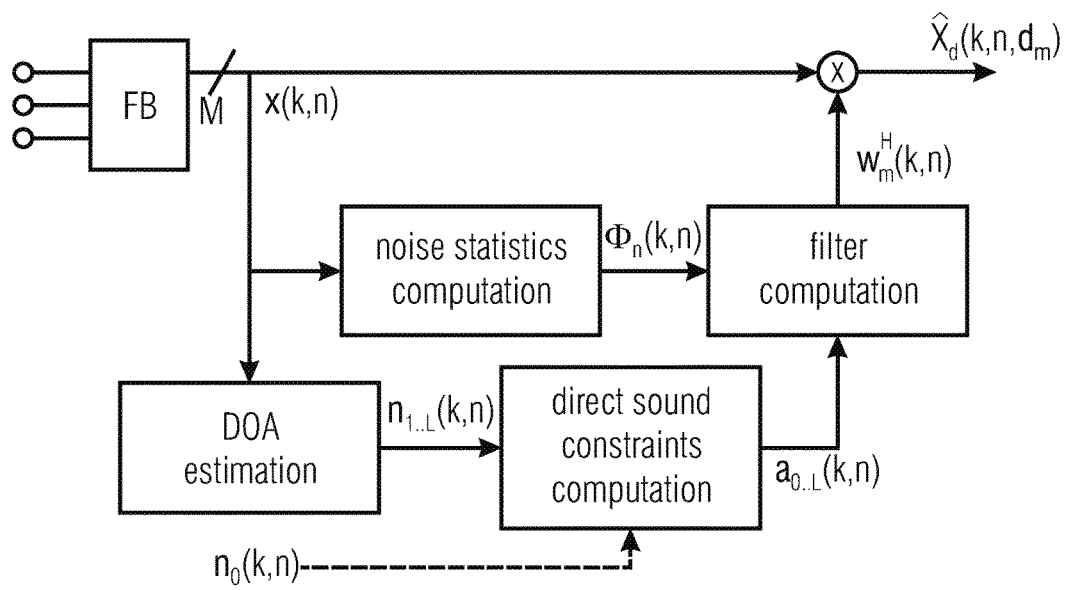
FIG. 2 shows a schematic block diagram of an approach for extracting diffuse sound with a multi-channel filter.

An example system for extracting the diffuse sound with the presented multi-channel filter is illustrated in FIG. 2. After transforming the microphone signals into the time-frequency domain, we estimate the stationary noise and the DOA of the L plane waves. From the DOA information the M+1 linear direct sound constraints ($a_l$ and $a_0$) are then obtained. Based on this information, the filter weights can be computed. Applying these weights to the microphone signals yields the desired estimate of the diffuse sound. It is clear from this description that the obtained filter does only depend on the direct sound (i.e., on the DOAs and the corresponding relative transfer functions of the plane waves between the microphones, respectively), but not on the diffuse sound. This means that the filter does not consider potentially available information on the diffuse sound, even though it is used to estimate the diffuse sound.

In this invention, we propose a novel multichannel filter for extracting reverberant sound that overcomes the limitations of the aforementioned filters. The proposed spatial filter is characterized by a directivity pattern, which tends to an omnidirectional pattern, except for the directions-of-arrival (DOAs) of the direct sound for which it exhibits spatial nulls. This represents a highly desired property for capturing diffuse sound from all directions with low distortion.

In the following, we propose a multi-channel filter to estimate the diffuse sound $X_d(k,n,d_m)$ at position $d_m$ with $M>1$ microphones. As for the multi-channel filters described above, the diffuse sound pressure at the m-th microphone is estimated by performing a linear combination of the microphone signals, i.e., $$\hat{X}_d(k,n,d_m) = w_m^H(k,n)x(k,n).$$

The weight-vector $w_m$, which is proposed in the following, minimizes a specific cost function and is linearly constrained similarly to the multi-channel filters described above.

However, in contrast to the multi-channel filters described above, we propose to use a linear constraint which does not depend on the direct sound (i.e., on the L plane waves). More precisely, the proposed novel constraint is not a function of the DOAs of the plane waves or the corresponding relative transfer functions of the plane waves between the microphones, respectively.

In contrast, the proposed novel constraint depends on statistical information on the diffuse sound, i.e., the proposed novel constraint depends on the relative transfer functions of the diffuse sound between the microphones. We will show in the following that the proposed novel constraint is a function of the coherence or correlation of the diffuse sound between the microphones. This coherence corresponds to the mean relative transfer function of the diffuse sound between the microphones.

The proposed spatial filter is obtained by minimizing a specific cost function while satisfying a distortionless constraint for the diffuse sound. This constraint corresponds to the relative transfer function of the diffuse sound between the microphones. Expressed mathematically, the filter is computed as subject to the linear constraint $$w_m(k,n) = \underset{w}{\operatorname{argmin}} J(w)$$

Here, J is the cost function to be minimized by the filter. The cost function can be for instance the stationary noise power at the filter output, the interfering energy at the filter output, or the quadratic error of the estimated diffuse sound. Examples for J will be provided in the embodiments. The constraint vector $b_m$ is given by $b_m(k,n)=[B_{1,m}(k,n), B_{2,m}(k,n), \ldots, B_{M,m}(k,n)]^T$. The m'-th element $B_{m',m}$ is the relative transfer function of the diffuse sound between microphone m and m'. This relative transfer function is given by $$B_{m',m}(k,n) = \frac{X_d(k,n,d_m)}{X_d(k,n,d_{m'})}.$$

Note that the m-th element of $b_m$ is equal to 1. With this constraint we capture the diffuse sound without distortion. In fact, let $x_d(k,n)=[X_d(k,n,d_1), X_d(k,n,d_2), \ldots, X_d(k,n,d_M)]^T$ be a vector containing the recorded diffuse sound. With the equations above, this vector can be written as $$x_d(k,n) = b_m(k,n)X_d(k,n,d_m).$$

The diffuse sound at the output of the filter is given by $w^H(k,n)x_d(k,n)$, which is identical to $X_d(k,n,d_m)$ since $w^H b_m(k,n)=1$. Therefore, this filter captures the diffuse sound without distortion. The relative transfer functions in $b_m$ typically cannot be estimated in practice since it is basically random, i.e., we have a different realization of the transfer function for each k and n. Thus, in practice, $B_{m',m}$ is computed as the mean relative transfer function between microphone m and m', i.e., $$B_{m',m}(k,n) = \gamma_{m',m}(k,n).$$

This mean relative transfer function $\gamma_{m',m}$ corresponds to the so-called spatial coherence of the diffuse sound between microphone m and m', which is defined as $$\gamma_{m',m}(k,n) = \frac{E\{X_d(k,n,d_m)X_d^*(k,n,d_{m'})\}}{\sqrt{E\{|X_d(k,n,d_m)|^2\}E\{|X_d(k,n,d_{m'})|^2\}}}.$$

where (•)* denotes complex conjugate. This spatial coherence describes the correlation of the diffuse sound between microphone m and m' in the frequency domain. This coherence depends on the specific diffuse sound field. The coherence can be measured in advance for a given room. Alternatively, the coherence is known from theory for specific diffuse sound fields [Elko2001]. For instance for a spherically isotropic diffuse sound field, which can often be assumed in practice, we have $$\gamma_{m',m}(k,n) = \operatorname{sinc}\left(2\pi \frac{f}{c} r_{m',m}\right)$$

where sinc denotes the sine function, $f$ is the acoustical frequency for the given frequency band k, and c is the speed of sound. Moreover, $r_{m',m}$ is the distance between microphone m and m'. When using the spatial coherence as the linear constraint $B_{m',m}$, which represents the mean relative transfer function of the diffuse sound between the microphones, then the obtained filter is equivalent to the sum of many linearly constrained spatial filters, where each of these filters captures a different realization of the random diffuse sound without distortion.

With the diffuse sound constraint introduced above, we obtain a spatial filter that captures the diffuse sound equally well from all directions. This is in contrast to the multi-channel filters described above, which captures the sound mainly from one direction, namely the direction to which the chosen propagation vector $a_0$ corresponds.

Note that the diffuse sound constraint $b_m$ is conceptually very different from the direct sound constraints $a_l$ and $a_0$. Therefore, the novel filter proposed in this section is conceptually very different compared to the multi-channel filters described above.

Figure 3:
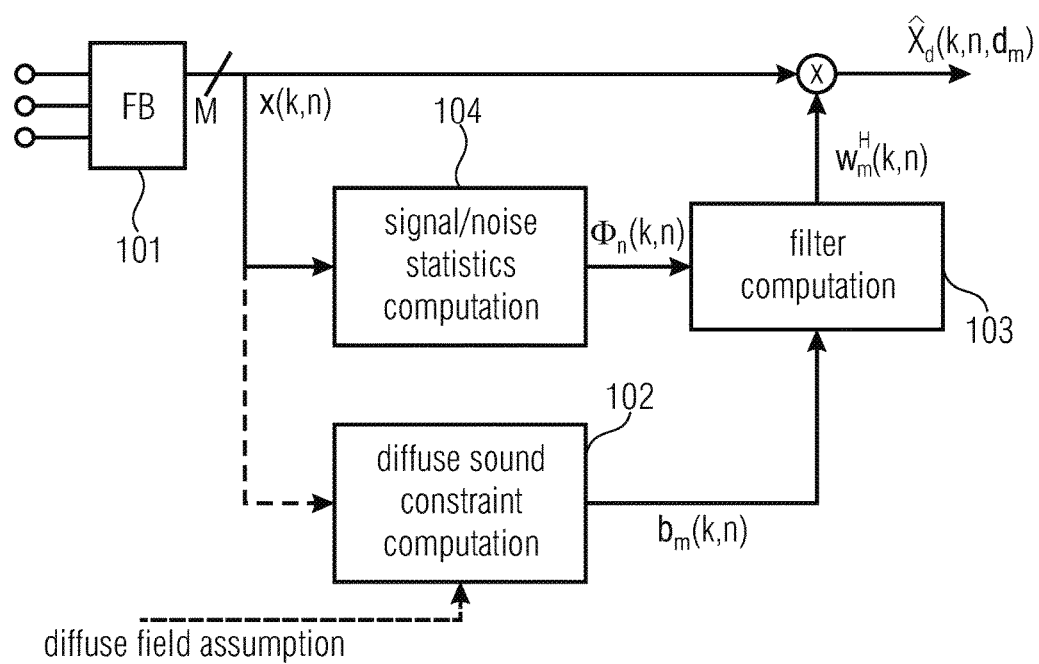
FIG. 3 shows a schematic block diagram of the proposed invention according to a first example for implementation.

A block scheme of the proposed invention is depicted in FIG. 3. First, the M microphone signals are transformed into the time-frequency domain (or another suitable domain for the signal processing) using a filterbank (FB) (101). Secondly, we compute the linear diffuse sound constraint vector $b_m$ in block (102). The diffuse sound constraint vector is either estimated from the signal, or it corresponds for instance to the theoretical spatial coherence for a specific assumed diffuse field as mentioned before. In block (104), we estimate specific statistics (e.g., noise statistics) from the microphone signals. This information, which is usually represented as a PSD matrix $\Phi(k,n)$, is used to generate the cost function J which has to be minimized by the filter. The filter-weights that minimize the cost function subject to the diffuse sound constraint are computed in block (103). Finally, the weights are applied to the microphone signals resulting in the desired diffuse sound estimate. Specific realizations of the invention are presented in the following embodiments.

Minimizing the Output Power Satisfying a Diffuse Sound Constraint

In this embodiment, we define a spatial filter that minimizes the entire output of the filter subject to the diffuse sound constraint. The diffuse sound constraint ensures that the diffuse sound is preserved by the spatial filter while the remaining signal parts (undesired stationary noise and plane waves) are minimized. The filter weights $w_m$ are computed as $$w_m(k, n) = \underset{w}{\mathrm{argmin}}\, w^H \Phi_x(k, n) w$$

subject to the linear constraint $$w^H b_m(k,n) = 1.$$

A close-form solution to this filter is given by [VanTrees2002]

$$w_m^H(k, n) = \frac{b_m^H(k, n)\Phi_x^{-1}(k, n)}{b_m^H(k, n)\Phi_x^{-1}(k, n)b_m(k, n)}.$$

Here, $\Phi_x$ is the PSD matrix of the microphone signals, which can be computed as $$\Phi_x(k,n) = E\{x(k,n)x^H(k,n)\},$$

where $x(k,n)$ is the vector containing the microphone signals. In practice, the expectation is approximated for instance by a temporal averaging. Moreover, the elements of the constraint vector $b_m(k,n) = [B_{1,m}(k,n), B_{2,m}(k,n), \ldots, B_{M,m}(k,n)]^T$ correspond to the spatial coherence of the diffuse sound between microphone m and m', i.e., $$B_{m',m}(k,n) = \gamma_{m',m}(k,n).$$

Actually, the spatial coherence $B_{m',m}$ does not need to depend on time (that is, $B_{m',m}(k,n) = B_{m',m}(k)$), hence the spatial coherence can be estimated in advance or assume a theoretical value. The spatial coherence may be either estimated from the microphone signals (during periods where only the diffuse sound is present) using $$\gamma_{m',m}(k, n) = \frac{E\{X(k, n, d_m)X^*(k, n, d_{m'})\}}{\sqrt{E\{|X(k, n, d_m)|^2\}E\{|X(k, n, d_{m'})|^2\}}},$$

or given as a priori information assuming a specific diffuse sound field. In the latter case, we use for instance the spatial coherence for a spherically isotropic diffuse sound field, i.e., $$\gamma_{m',m}(k, n) = \mathrm{sinc}\left(2\pi \frac{f}{c} r_{m',m}\right).$$

Note that the sinc function might be replaced by other functions depending on the assumed sound field. For different diffuse sound fields there exist different coherence functions that are known a priori. Examples can be found in [Elko2001].

A block scheme of this embodiment is shown in FIG. 3. After transforming the microphone signals with a filterbank (101), we compute the signal PSD matrix $\Phi_x$ in the signal statistics estimation block (104). Moreover, we compute the linear diffuse sound constraint vector $b_m$ in block (102) either from the signal or using a priori information assuming a specific diffuse sound field. The filter weights are then computed in block (103). Multiplying the weights with the microphone signals yields the desired estimate of the diffuse sound.

The filter computed in this embodiment has the following advantages compared to other spatial filter (e.g., the filters described in the background art):

Since we minimize the entire output signal, the filter provides an optimal trade-off between attenuation of the L plane waves and the stationary noise.

The necessitated signal PSD matrix $\Phi_x$, and thus the filter, is easy to compute in practice.

No DOA information of the L plane waves is needed.

Linearly Constrained Minimum Variance Filter

This embodiment represents a combination of the novel approach and the state-of-the-art approach of multi-channel filters described above in connection with FIG. 2. In this embodiment, we define a linearly constrained spatial filter that minimizes the stationary noise at the filter output subject to the diffuse constraint and additional directional constraints. The filter weights $w_m$ are computed as $$w_m(k, n) = \underset{w}{\mathrm{argmin}}\, w^H \Phi_n(k) w$$

subject to the linear constraints $$w^H b_m(k,n) = 1$$

and $$w^H a_L(k,n) = 0\, \forall l$$

Clearly, the filter minimizes only the stationary noise at the output. The undesired plane waves are suppressed with the second linear constraints (as explained above for the multi-channel filters, FIG. 2). These additional constrains compared to the output power minimizing filter according to FIG. 3 ensure an even stronger suppression of the interfering plane waves. The resulting filter still preserves the diffuse sound due to the first linear constraint. A closed-form solution to this filter, which can be computed in practice, is given by $$w_m^H(k,n) = g^H(k,n)[C^H(k,n)\Phi_n^{-1}(k)C(k,n)]^{-1}C^H(k,n)\Phi_n^{-1}(k)$$

Here, vector $C = [b_m, a_1, a_2, \ldots, a_L]$ is the constraint matrix containing the linear constraints defined above and $g = [1, O]^T$ (O being a zero-vector of length L) are the corresponding responses. As for the multi-channel filter shown in FIG. 2, the vectors $a_l$ depend on the DOAs of the L plane waves and can be computed as well-known from literature [VanTrees2002]. In contrast, the elements of $b_m$ describe the correlation or coherence of the diffuse sound between the microphones. The elements of $b_m$ are computed as explained in connection with FIG. 3. Moreover, $\Phi_n$ is the PSD matrix of the stationary noise. This PSD matrix can be estimated e.g. during speech pauses. If the stationary noise in the different microphones is mutually independent, we can simply replace $\Phi_n$ by the identity matrix of size M by M.

Figure 4:
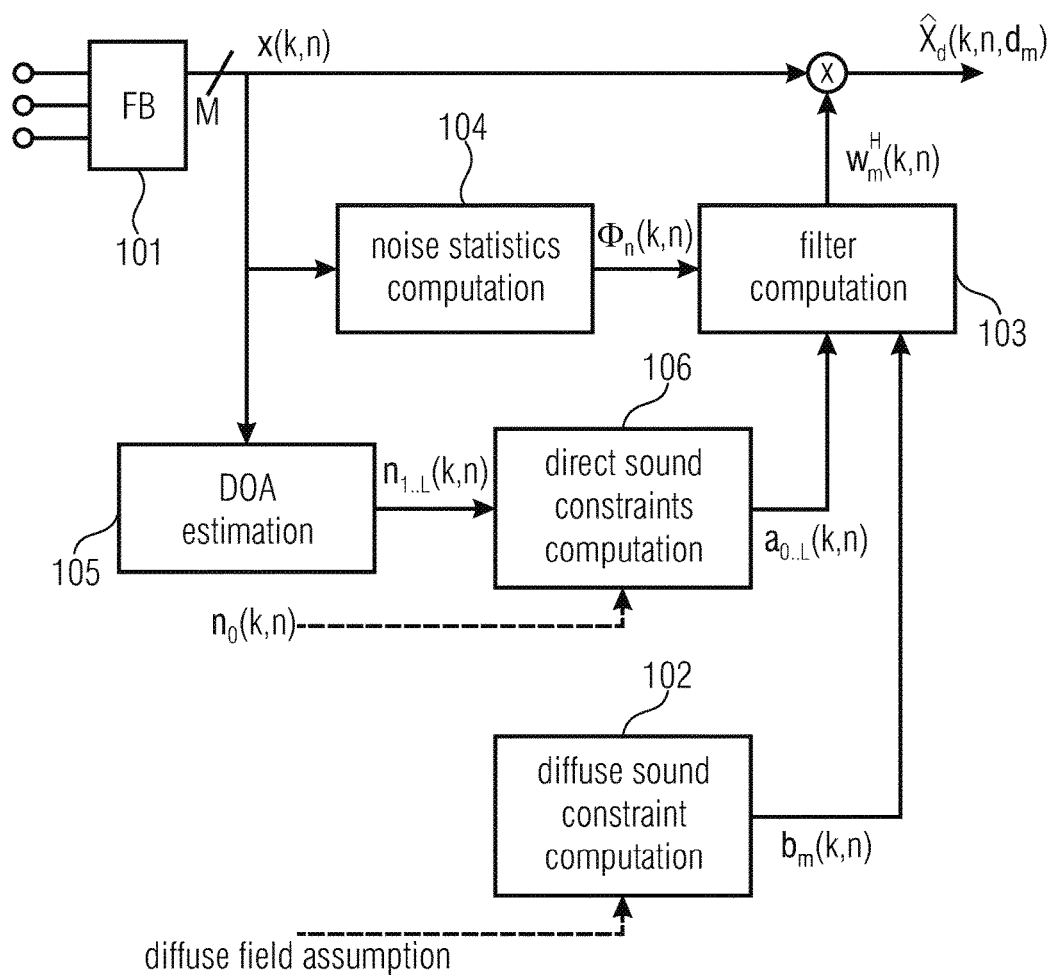
FIG. 4 shows a schematic block diagram of the proposed invention according to a second example for implementation.

A block scheme of this embodiment is shown in FIG. 4. After transforming the microphone signals with a filterbank (101), we compute the PSD matrix $\Phi_n$ of the stationary noise in the noise statistics estimation block (104). Moreover, we compute the linear diffuse sound constraint $b_m$ in block (102) either from the signal or using a priori information assuming a specific diffuse sound field. In block (105), we estimate the DOAs of the L plane waves. From this information, we compute the direct sound constraints $a_l$ in block (106). The computed information is fed to the filter computation block (103), which computes the filter-weights $w_m$ with the closed-form solution presented above. Multiplying the weights with the microphone signals yields the desired estimate of the diffuse sound.

An example of a resulting pick-up pattern for this filter is depicted in FIG. 7. Here, two direct sounds arrive from an azimuth direction 51° and 97°. The figure shows the resulting pick-up pattern at a frequency of 2.8 kHz when using an uniform linear array with 16 microphones with 5 cm microphone spacing. The pick-up pattern possesses nulls exactly for 51° and 97°. Otherwise it is almost omnidirectional. This is a major advantage over the state-of-the-art spatial filter shown in FIG. 2 which yields the spatial filter in FIG. 6.

The filter computed in this embodiment has the following advantages compared to other spatial filter (e.g., the filters described in the background art):

Strong attenuation of the plane waves due to the direct sound constraints.

Almost Omni-directional pick-up pattern which is desired for capturing diffuse sound.

Combined Approach

The spatial filters shown in FIGS. 3 and 4 in general provide a good performance in practice. However, they also suffer from specific drawbacks. For instance the filter of FIG. 3 typically does not suppress the direct sound completely. The remaining power of the direct sound can lead to undesired effects during spatial sound reproduction. In contrast, the spatial filter of FIG. 4 provides a comparatively poor robustness against the stationary noise at low frequencies. In the following, we combine the spatial filters in FIGS. 3 and 4 in order to exploit the advantages of both spatial filters while mitigating the drawbacks. As a result, we obtain a spatial filter that is characterized by a good interference suppression (direct sound suppression) and high robustness against stationary noise.

The approach proposed in the following represents a so-called parametric multi-channel Wiener filter (PMWF) that can be scaled between a so-called minimum mean square error (MMSE) spatial filter and the spatial filter in FIG. 3. Additionally, the spatial filter in FIG. 4 is used to estimate specific necessitated quantities.

The weight-vector of the proposed PMWF is computed as $$w_m(k, n) = \underset{w}{\operatorname{argmin}} \, w^H \Phi_x(k) w$$

subject to $$E\{|X_d(k,n,d_m) - \hat{X}_d(k,n,d_m)|^2\} < \sigma^2$$

where $\sigma^2$ is the maximum squared absolute error of the estimated diffuse sound. Solving this optimization problem leads to $$w_m(k, n) = \frac{\varphi_d(k, n)}{\beta + 1} \Phi_x^{-1}(k, n) b_m$$

where we define $$\beta = \alpha(\phi_d b_m^H \Phi_x^{-1} b_m)$$

Here, $\alpha \in [0,1]$ is a user-defined control parameter. For $\alpha=0$, we obtain the MMSE spatial filter which minimizes the mean-squared error of the estimated diffuse sound. For $\alpha=1$, we obtain the spatial filter proposed in FIG. 3. For a values in between, we have a scaling between the two spatial filters. A smaller a yields a better noise and interference suppression, while a higher $\alpha$ yields a diffuse sound estimate with less distortion. Note that the elements of $b_m$ are computed as explained in connection with FIG. 3. The power of the diffuse sound $\phi_d$ can be computed with the spatial filter proposed in FIG. 4 which provides a very good suppression of the plane waves. Let $w_1$ denote the spatial filter in FIG. 4 for estimating the diffuse sound at the first microphone. Given $w_1$, the diffuse sound power at the first microphone can for instance be obtained as described in [Thiergart2013b], i.e., $$\hat{\phi}_d(k, n) = \frac{w_1^H(k, n)[\Phi_x(k, n) - \Phi_n(k, n)]w_1(k, n)}{w_1^H(k, n)\Gamma_d w_1(k, n)}$$

or with a decision directed approach as explained in [Kowalczyk2013]. In the preceding formula, $\Gamma_d$ is the M×M spatial coherence matrix for the diffuse sound. The (m,m')-th element of $\Gamma_d$ is the spatial coherence $\gamma_{m',m}$ between microphone m and m'. This spatial coherence $\gamma_{m',m}$ was already defined above.

Figure 5:
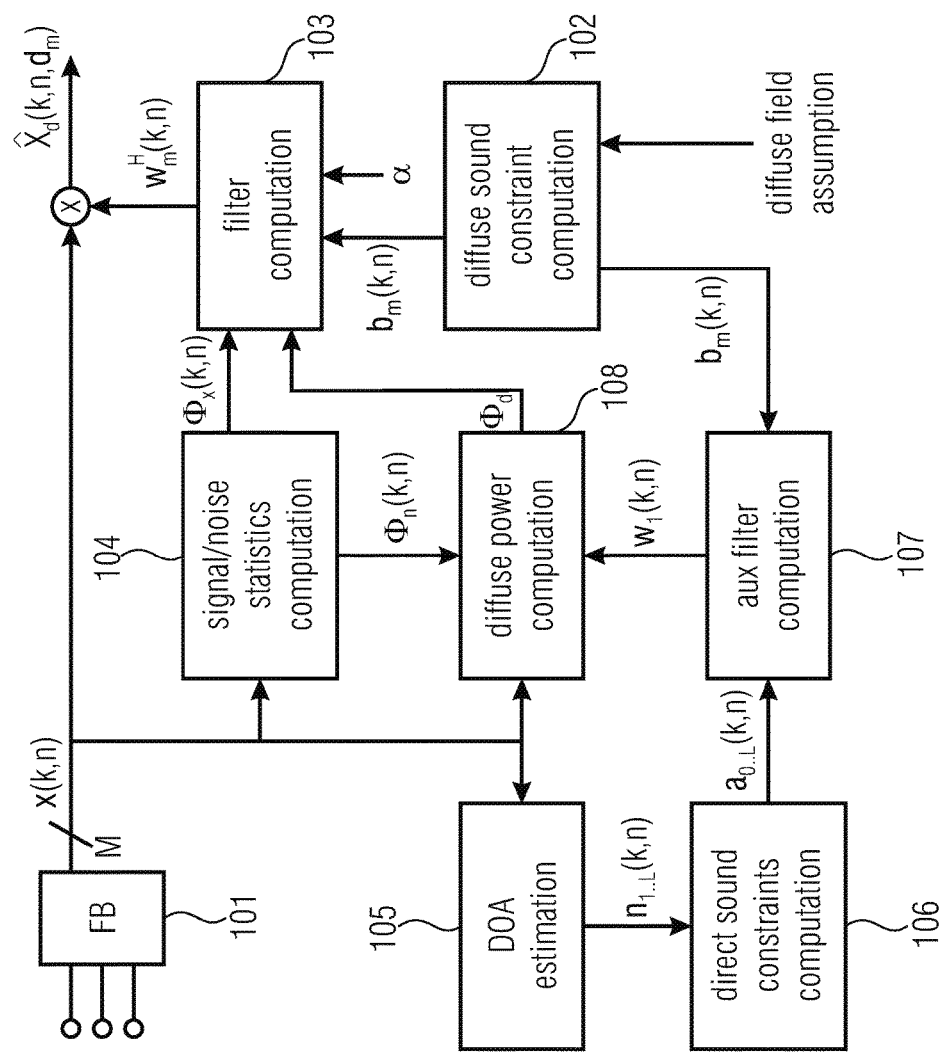
FIG. 5 shows a schematic block diagram of the proposed invention according to a third example for implementation.

A block scheme of this embodiment is shown in FIG. 5. After transforming the microphone signals with a filterbank (101), we compute the microphone PSD matrix $\Phi_x$ and noise PSD matrix $\Phi_n$ in block (104). Moreover, we compute the linear diffuse sound constraint $b_m$ in block (102) either from the signal or using a priori information assuming a specific diffuse sound field. In block (105), we estimate the DOAs of the L plane waves. From this information, we compute the direct sound constraints $a_l$ in block (106). These constraints are used in (107) together with $\Phi_n$ to compute the weights $w_1$. The power of the diffuse sound $\phi_d$ is computed in (108) from $w_1$ and $\Phi_n$. The final weights of the spatial filter $w_m$ can then be computed in (103) using $\phi_d$, $\Phi_x$, and $b_m$. With the parameter a one can scale the spatial filter between the MMSE filter and PMWF. Multiplying the weights $w_m$ with the microphone signals yields the desired estimate of the diffuse sound.

Figure 8:
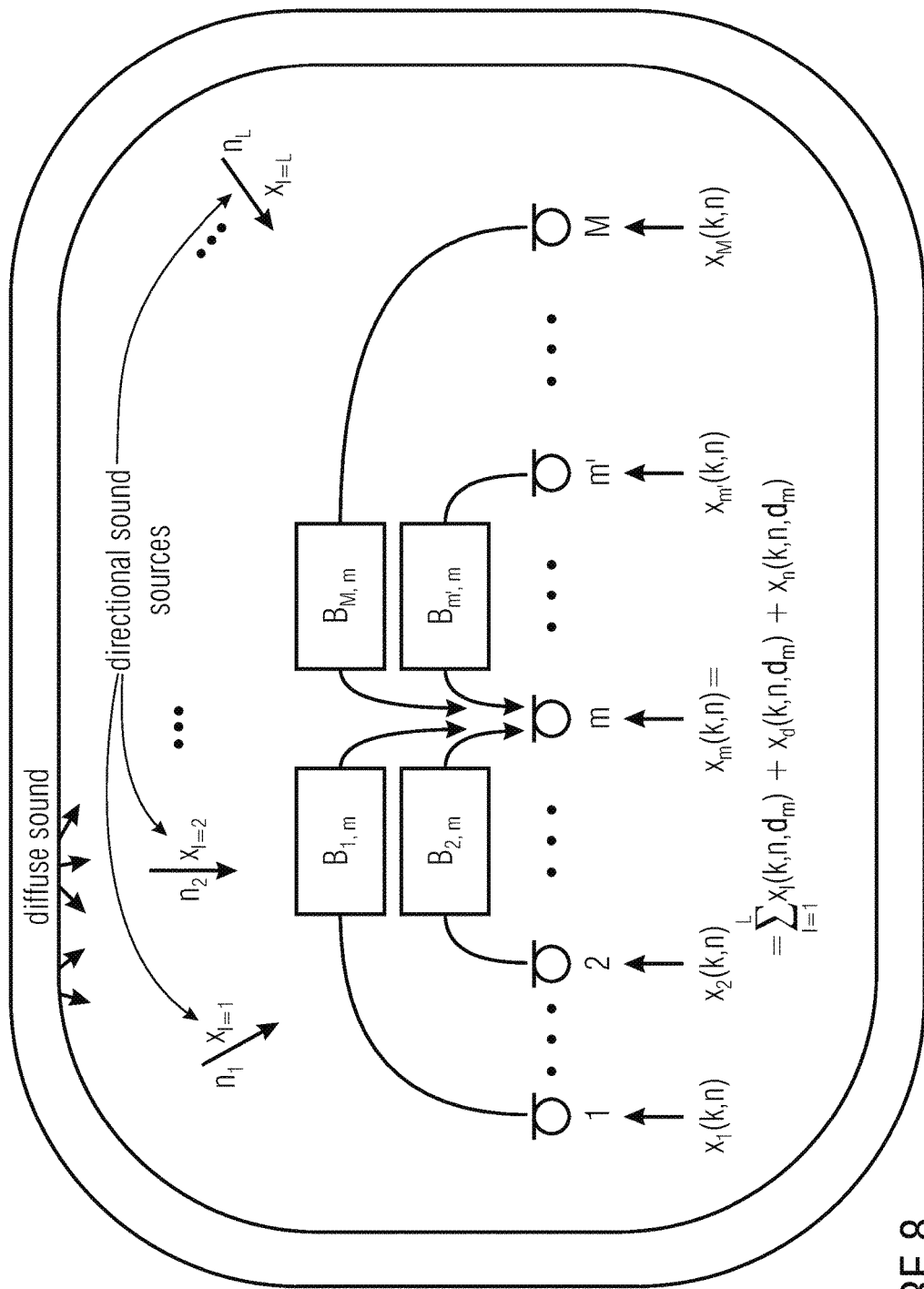
FIG. 8 schematically illustrates a microphone array and different sound signals that are acquired by the microphone array.

FIG. 8 schematically illustrates a microphone array comprising M microphones. The microphone array is exposed to a sound field comprising direct sound portions and diffuse sound portions. The direct sound portions are represented in FIG. 8 by L sound sources $X_{1=l}$ to $X_{1=L}$, each being assumed to generate a substantially plane wave at the location of the microphone array. The propagation direction of each plane wave (at the location of the microphone array) is indicated in FIG. 8 by the vectors $n_1$ to $n_L$. The direct sound portions are typically a function of the location $d_m$. The diffuse sound $X_d(k,n,d_m)$ can model for instance the reverberation in a room. The diffuse sound is assumed to be generated by an infinite sum of plane waves with random phases, random magnitude, and random DOAs. This means, the diffuse sound is generated by an infinite number of sources randomly distributed around the sound scene. These sound sources model the infinite number of room reflections which generate the late reverberation.

An individual microphone signal, for example for the m-th microphone, $X_m(k,n)$ is a combination of the L direct sound portions $X_{1=l}$ to $X_{1=L}$, the diffuse sound portion $X_d$, and noise $X_n$, i.e.

$$X_m(k,n) = \sum_{l=1}^{L} X_l(k,n,d_m) + X_d(k,n,d_m) + X_n(k,n,d_m).$$

Relative transfer functions $B_{1,m}, B_{2,m}, \ldots, B_{m',m}, \ldots, B_{M,m}$ for the diffuse sound between the other microphones to the m-th microphone are schematically illustrated in FIG. 8. The relative transfer function $B_{m',m}$ from the m-th microphone to itself (not depicted in FIG. 8) is typically equal to 1.

The following list provides a brief overview of some of the aspects that have been described above:
Receiving at least two microphone signals.
Transforming the microphone signals into the time-frequency domain or another suitable domain.
Computing a linear diffuse sound constraint as a function of the correlation or coherence of the diffuse sound between the microphones.
Computing signal and/or noise statistics.
In some embodiments: estimating the DOAs of the direct sounds and computing direct sound constraints that represent the relative transfer functions of the direct sounds between the microphones.
In some embodiments: computing an auxiliary filter and estimate the power of the diffuse sound.
Computing the weights of a spatial filter for extracting the diffuse sound using the obtained signal/noise statistics and optional diffuse sound power information by considering the diffuse sound constraint.
Performing a linear combination of the microphone signals using the computed weights of the spatial filter.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer pro-gram product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer pro-gram for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[Pulkki2007] V. Pulkki, "Spatial sound reproduction with directional audio coding," *J Audio Eng. Soc*, Vol. 55, No. 6, pp. 503-516, June 2007.
[Thiergart2013] O. Thiergart, G. Del Galdo, M. Taseska, and E. Habets, "Geometry-based spatial sound acquisition using distributed microphone arrays," *Audio, Speech, and Language Processing, IEEE Transactions on*, Vol. 21, No. 12, pp. 2583-2594, December 2013.
[Kowalczyk2013] K. Kowalczyk, O. Thiergart, A. Craciun, and E. A. P. Habets, "Sound acquisition in noisy and reverberant environments using virtual," in *Applications of Signal Processing to Audio and Acoustics (WASPAA)*, 2013 IEEE Workshop on, October 2013.

[Thiergart2013b] O. Thiergart and E. A. P. Habets, "An informed LCMV filter based on multiple instantaneous direction-of-arrival estimates," in *Acoustics Speech and Signal Processing (ICASSP)*, 2013 IEEE International Conference on, 2013, pp. 659-663.

[Thiergart2012] O. Thiergart, G. D. Galdo, and E. A. P. Habets, "On the spatial coherence in mixed sound fields and its application to signal-to-diffuse ratio estimation," *The Journal of the Acoustical Society of America*, vol. 132, no. 4, pp. 2337-2346, 2012.

[VanTrees2002] H. L. Van Trees, *Detection, Estimation, and Modulation Theory: Part IV: Array Processing*. John Wiley & Sons, April 2002, vol. 1.

[Elko2001] G. W. Elko, "Spatial coherence functions for differential micro-phones in isotropic noise fields", in *Microphone Arrays: Signal Processing Techniques and Applications*, edited by M. Brandstein and D. Ward, chapter 4, 61-85 (Springer, Berlin) (2001).

The invention claimed is:

1. A method for obtaining filter coefficients for a diffuse sound filter, the method comprising:

defining a linear constraint for the filter coefficients of the diffuse sound filter, the linear constraint being based on a spatial coherence between a first diffuse sound portion in a first microphone signal and a second diffuse sound portion in a second microphone signal, the first microphone signal being captured by a first microphone and the second microphone signal being captured by a second microphone spaced apart from the first microphone;

calculating at least one of a direction of arrival of at least one direct sound, signal statistics over the first and second microphone signals, and noise statistics over the first and second microphone signals;

determining the filter coefficients of the diffuse sound filter by solving an optimization problem concerning at least one of the direction of arrival of the at least one direct sound, the signal statistics, and the noise statistics while considering the linear constraint for the filter coefficients; and using the filter coefficients within the diffuse sound filter for extracting a diffuse sound from or for suppressing a direct sound in a recording comprising the first microphone signal and the second microphone signal, wherein one or more of the defining, the calculating, the determining, and the using is implemented, at least in part, by one or more hardware elements of an audio signal processing device.

2. The method according to claim 1, further comprising providing the spatial coherence on the basis of a relative transfer function or a correlation of the diffuse sound between the first microphone and the second microphone.

3. The method according to claim 1,
wherein the spatial coherence is based on a prior measurement of a relative transfer function or a correlation of the diffuse sound for a given environment during time periods in which no direct sound is present in the environment.

4. The method according to claim 1,
wherein the spatial coherence is based on an a priori information assuming a specific diffuse sound field having assumed properties regarding a correlation of the diffuse sound between the first microphone and the second microphone.

5. The method according to claim 1, wherein the optimization problem is expressed by $$w_m(k, n) = \underset{w}{\arg\min}\, J(w)$$

subject to the linear constraint $$w^H b_m(k,n) = 1,$$

wherein $w(k,n)$ is a vector of the filter coefficients of the diffuse sound filter;

$w_m(k,n)$ is a solution of the optimization problem based on an evaluation of a microphone signal at the m-th microphone;

$J(w)$ is a cost function;

$b_m(k,n)$ is a vector of estimated spatial coherences, wherein the m'-th element of the vector is an estimated spatial coherence of the diffuse sound between the m-th microphone and the m'-th microphone;

k is a frequency domain index; and n is a time domain index.

6. The method according to claim 5, wherein the cost function J(w) is based on one of noise statistics, a noise power spectral density (PSD) matrix, signal statistics, or a microphone power spectral density (PSD) matrix.

7. The method according to claim 1, further comprising
estimating at least one of a direction of arrival of at least one direct sound or a relative transfer function of the at least one direct sound between the first microphone and the second microphone;

computing at least one direct sound constraint using the direction of arrival or the relative transfer function of the at least one direct sound, wherein the at least one direct sound constraint results in a suppression of the at least one direct sound.

8. The method according to claim 1, wherein a solution to the optimization problem is $$w_m(k, n) = \frac{\phi_d(k, n)}{\beta + 1} \Phi_x^{-1}(k, n) b_m$$

with $$\beta = \alpha(\phi_d b_m^H \Phi_x^{-1} b_m)$$

wherein $w_m(k,n)$ is a solution of the optimization problem based on an evaluation of a microphone signal at the m-th microphone;

$b_m(k,n)$ is a vector of estimated spatial coherences, wherein the m'-th element of the vector is an estimated spatial coherence of the diffuse sound between the m-th microphone and the m'-th microphone;

$\alpha \in [0,1]$ is a user-defined control parameter by which the diffuse sound filter can be scaled between a minimum mean square error spatial filter and a filter that minimizes the output power while satisfying the diffuse sound constraint;

$\phi_d$ is a diffuse sound power; and $\Phi_x$ is a power spectrum matrix of the microphone signals.

9. The method according to claim 8, further comprising estimating the diffuse sound power $\phi_d$ on the basis of an auxiliary diffuse sound filter.

10. The method according to claim 9, wherein estimating the diffuse sound power $\phi_d$ is performed based on $$\hat{\phi}_d(k,n) = \frac{w_1^H(k,n)[\Phi_x(k,n) - \Phi_n(k,n)]w_1(k,n)}{w_1^H(k,n)\Gamma_d w_1(k,n)}$$

wherein $\hat{\phi}_d$ is the estimated diffuse sound power which provides an estimate for the diffuse sound power $\phi_d$;

$w_1$ is a vector of filter coefficients of the auxiliary diffuse sound filter;

$\Phi_x$ is a power spectral density matrix of the microphone signals;

$\Phi_n$ is a power spectral density matrix of the noise within the microphone signals; and $\Gamma_d$ is a spatial coherence matrix for the diffuse sound, the (m,m')-th element of $\Gamma_d$ being a spatial coherence $\gamma_{m',m}$ between microphone m and m'.

11. The method according to claim 1, further comprising:
wherein the using the filter coefficients comprises performing a linear combination of the first microphone signal and the second microphone signal using the filter coefficients of the diffuse sound filter.

12. A non-transitory digital storage medium having stored thereon a computer program for performing a method for obtaining filter coefficients for a diffuse sound filter, the method comprising:
defining a linear constraint for the filter coefficients of the diffuse sound filter, the linear constraint being based on a spatial coherence between a first diffuse sound portion in a first microphone signal and a second diffuse sound portion in a second microphone signal, the first microphone signal being captured by a first microphone and the second microphone signal being captured by a second microphone spaced apart from the first microphone;
calculating at least one of a direction of arrival of at least one direct sound, signal statistics over the first and second microphone signals, and noise statistics over the first and second microphone signals;
determining the filter coefficients of the diffuse sound filter by solving an optimization problem concerning at least one of the direction of arrival of the at least one direct sound, the signal statistics, and the noise statistics while considering the linear constraint for the filter coefficients; and
using the filter coefficients within the diffuse sound filter for extracting a diffuse sound from or for suppressing a direct sound in a recording comprising the first microphone signal and the second microphone signal, when said computer program is run by a computer.

13. An apparatus for obtaining filter coefficients for a diffuse sound filter, the apparatus comprising:

a linear constraint calculator configured to define a linear constraint for the filter coefficients of the diffuse sound filter, the linear constraint being based on a spatial coherence between a first diffuse sound portion in a first microphone signal and a second diffuse sound portion in a second microphone signal, the first microphone signal being captured by a first microphone and the second microphone signal being captured by a second microphone spaced apart from the first microphone;
a calculator configured to calculate at least one of a direction of arrival of at least one direct sound, signal statistics over the first and second microphone signals, and noise statistics over the first and second microphone signals; and
a filter coefficients calculator configured to determine the filter coefficients of the diffuse sound filter by solving an optimization problem concerning at least one of the direction of arrival of the at least one direct sound, the signal statistics, and the noise statistics while considering the linear constraint for the filter coefficients,
wherein the apparatus is configured for using the filter coefficients within the diffuse sound filter for extracting a diffuse sound from or for suppressing a direct sound in a recording comprising the first microphone signal and the second microphone signal, and
wherein one or more of the linear constraint calculator, the calculator, and the filter coefficients calculator is implemented, at least in part, by one or more hardware elements of the apparatus.

14. The apparatus according to claim 13, wherein the spatial coherence is based on a relative transfer function of the diffuse sound between the first microphone and the second microphone.

15. The apparatus according to claim 13, further comprising
an auxiliary filter coefficients calculator configured to determine auxiliary filter coefficients of an auxiliary diffuse sound filter by solving a different optimization problem while considering a different linear constraint for the auxiliary filter coefficients than the filter coefficients calculator;
the auxiliary diffuse sound filter being configured to estimate an estimated diffuse sound power;
wherein the filter coefficients calculator is configured to take into account the estimated diffuse sound power when determining the filter coefficients of the diffuse sound filter.

16. The method according to claim 1, wherein the using the filter coefficients within the diffuse sound filter comprises multiplying the first microphone signal and the second microphone signal by the filter coefficients to obtain an estimate of a diffuse sound in the recording.

\* \* \* \* \*